March 18, 1952     I. MOORE     2,589,844
CHANGE-SPEED GEARING MULTIPLE DRIVE TRANSMISSION
Filed April 23, 1948     8 Sheets-Sheet 1
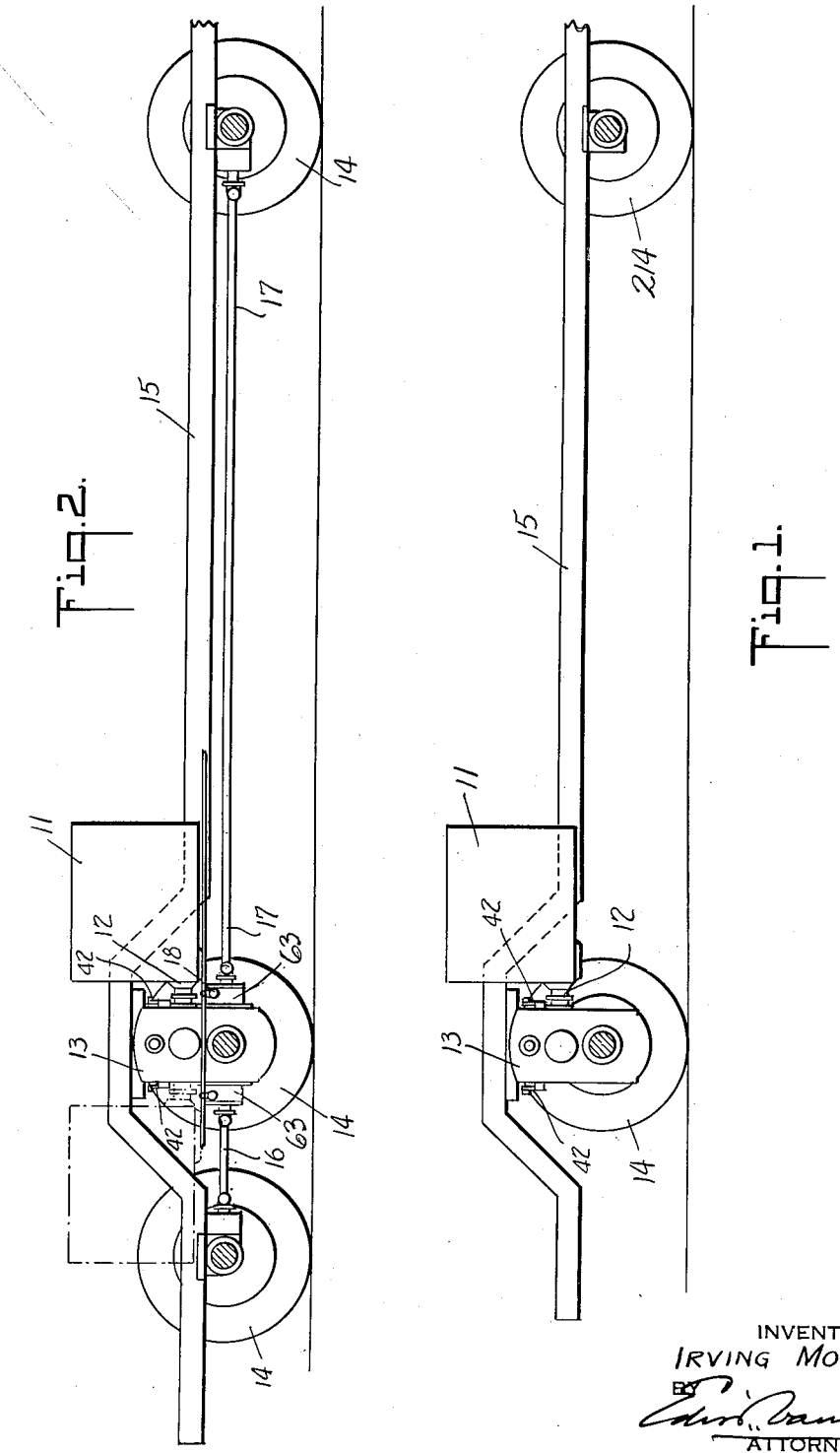
INVENTOR
IRVING MOORE
ATTORNEY March 18, 1952     I. MOORE     2,589,844
CHANGE-SPEED GEARING MULTIPLE DRIVE TRANSMISSION
Filed April 23, 1948     8 Sheets-Sheet 2
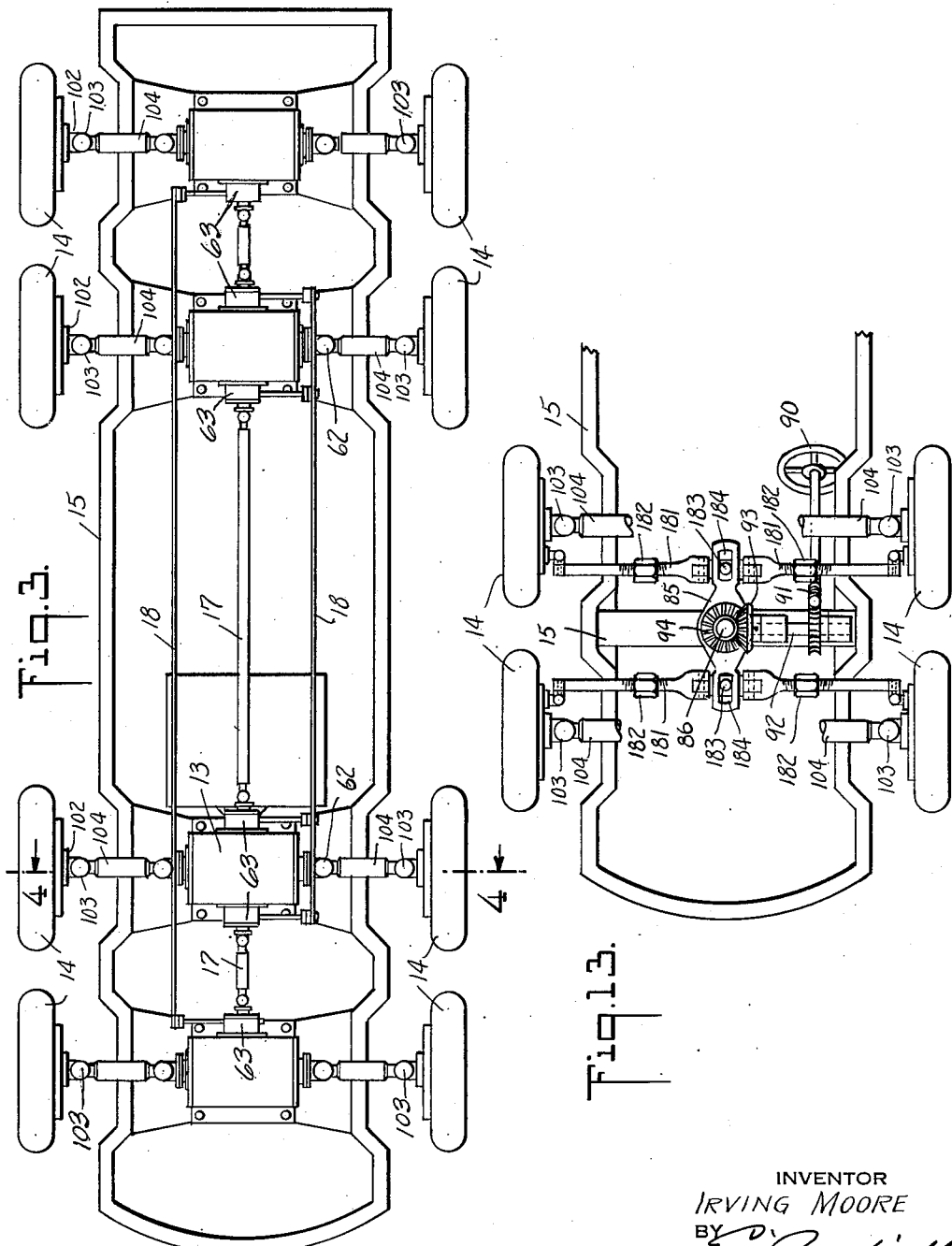
INVENTOR
IRVING MOORE
BY
ATTORNEY March 18, 1952     I. MOORE     2,589,844

CHANGE-SPEED GEARING MULTIPLE DRIVE TRANSMISSION

Filed April 23, 1948     8 Sheets-Sheet 3

INVENTOR
*IRVING MOORE*
BY
ATTORNEY

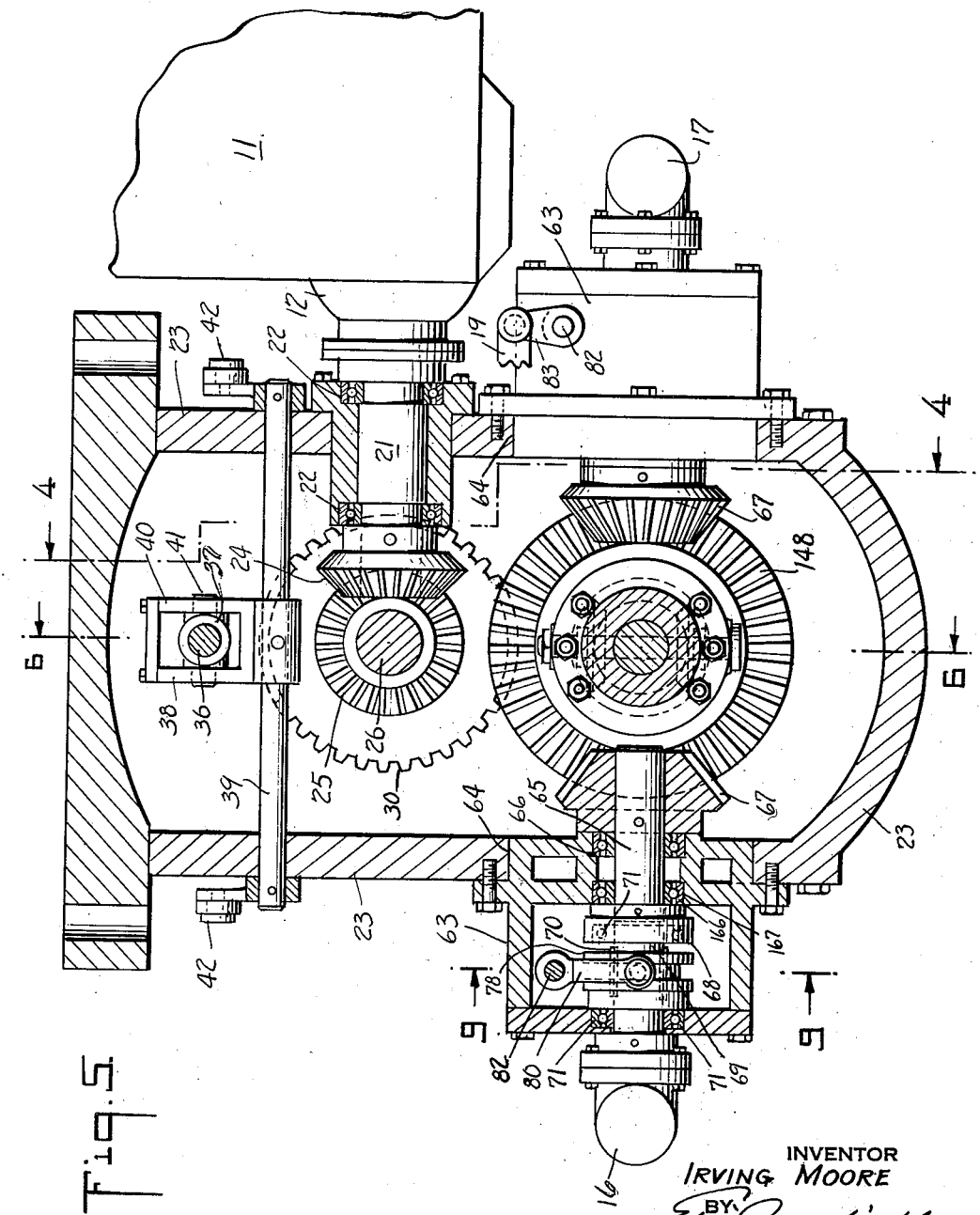

March 18, 1952 I. MOORE 2,589,844
CHANGE-SPEED GEARING MULTIPLE DRIVE TRANSMISSION
Filed April 23, 1948 8 Sheets-Sheet 5
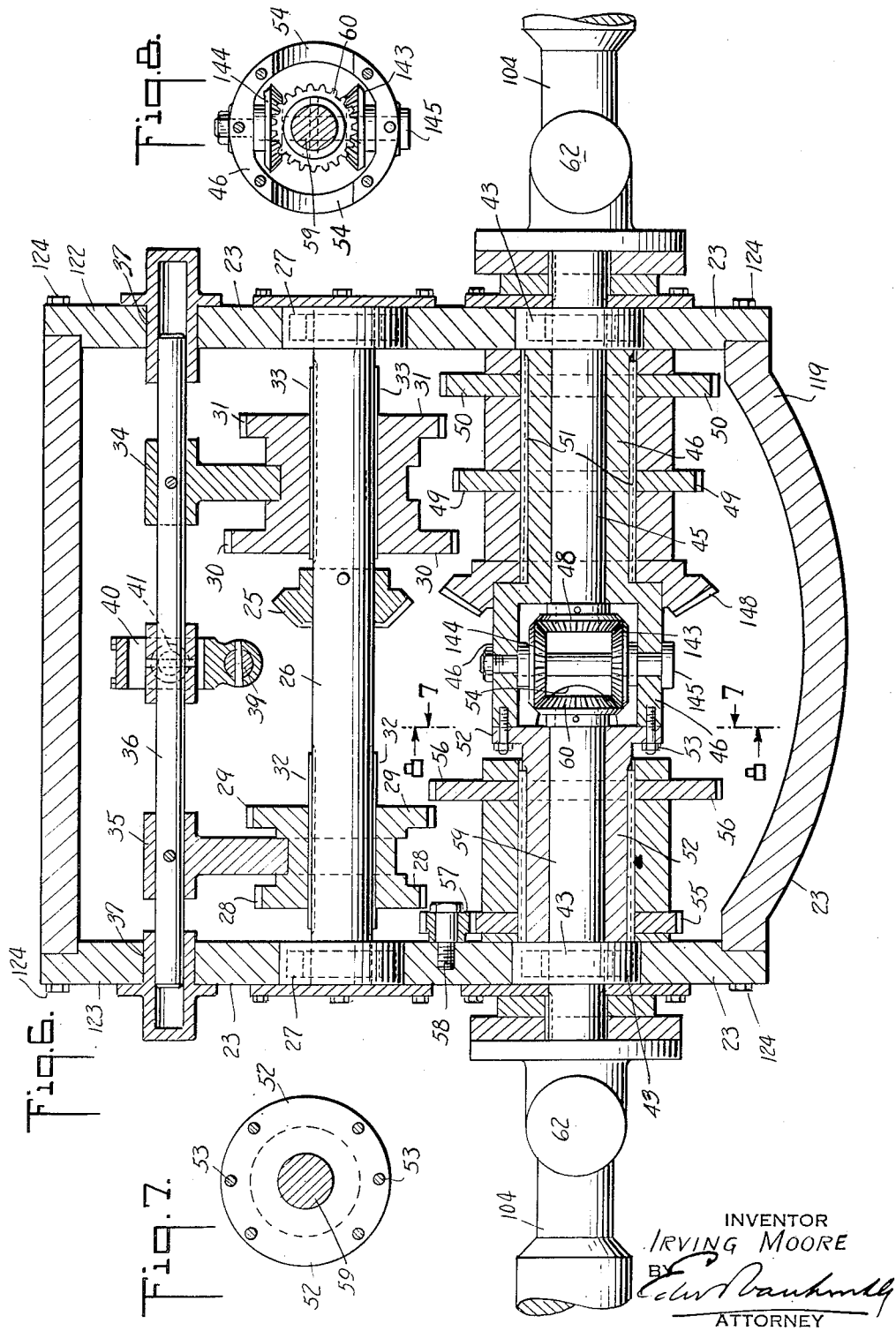
INVENTOR
IRVING MOORE
BY
ATTORNEY March 18, 1952     I. MOORE     2,589,844
CHANGE-SPEED GEARING MULTIPLE DRIVE TRANSMISSION
Filed April 23, 1948     8 Sheets-Sheet 6
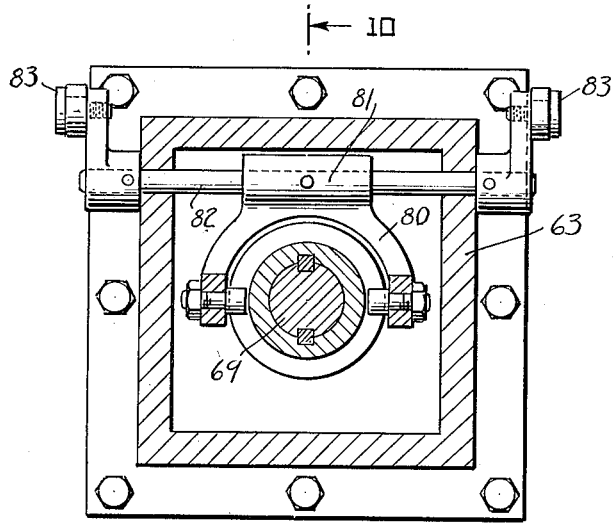
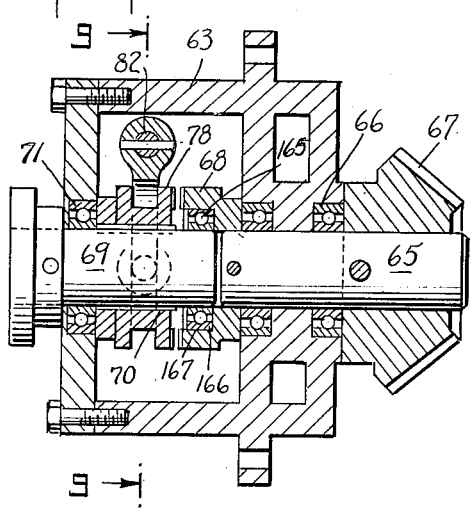
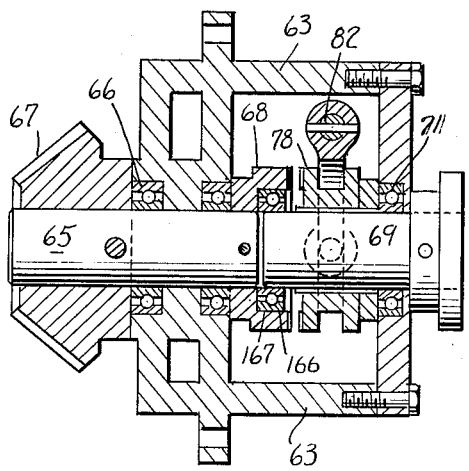
INVENTOR
*IRVING MOORE*
ATTORNEY

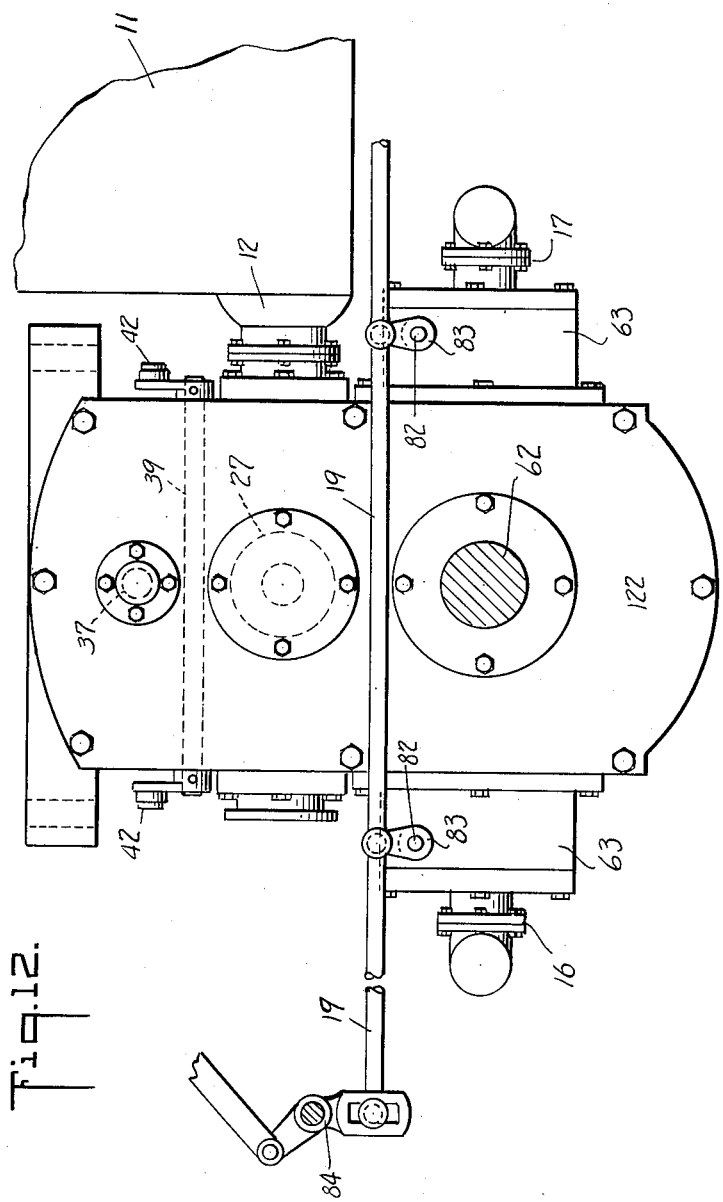

March 18, 1952     I. MOORE.     2,589,844
CHANGE-SPEED GEARING MULTIPLE DRIVE TRANSMISSION
Filed April 23, 1948     8 Sheets-Sheet 8
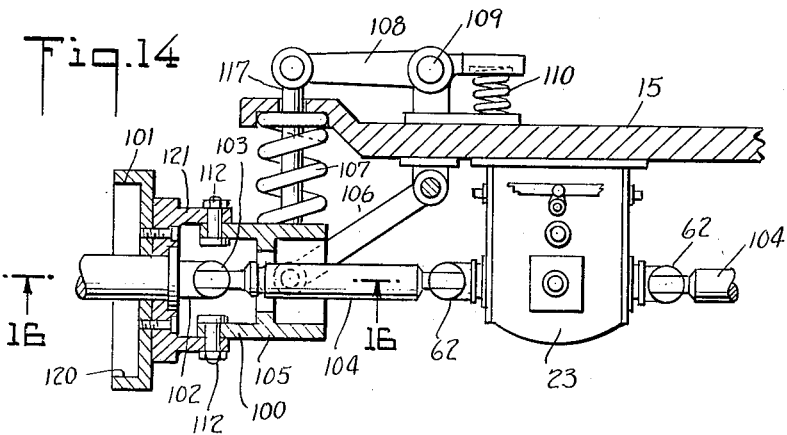
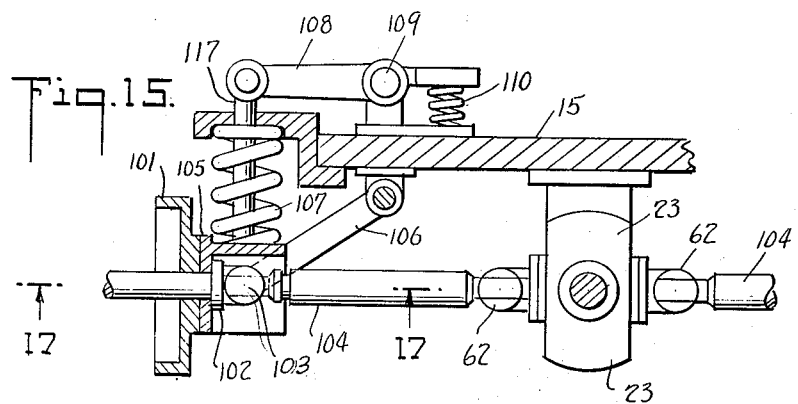
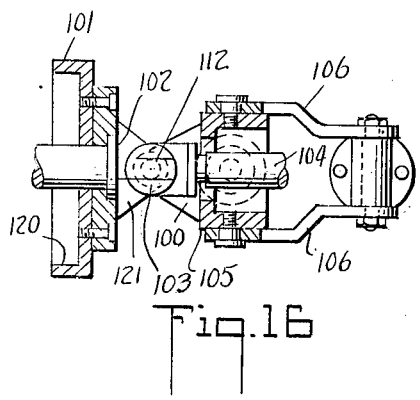
INVENTOR
IRVING MOORE
ATTORNEY Patented Mar. 18, 1952

2,589,844

UNITED STATES PATENT OFFICE 2,589,844

CHANGE-SPEED GEARING MULTIPLE DRIVE TRANSMISSION

Irving Moore, Scotch Plains, N. J.

Application April 23, 1948, Serial No. 22,834

1 Claim. (Cl. 180—49)

This invention stems from my application No. 695,709, filed September 9, 1946, and now abandoned, and relates to means for transmitting the power of a motor to the wheels of a vehicle through transmission differential in which one set of gears of transmission is mounted on the differential housing, the engaging set being adapted to move on a shaft parallel to the central axis of the differential shaft and transverse to central axis of motor shaft, the motor being directly connected to the bevelled pinion gear of the differential through the usual clutch member.

It has for its object the production of a unit transmission that may be readily adapted to any kind of motor vehicle including automobiles, busses and locomotives. The transmission differential may be mounted direct to a cross member of the vehicle chassis and connected to transmit flexible floating power to the wheels and to drive a plurality of driving wheels with one transmission located either from the front or rear of the vehicle and/or in any combination thereof.

It further provides a simple means to cut in and out of active driving any pair of wheels leaving the others in free wheeling.

It further provides a means to bring the power to both front and rear differentials with the position of the motor located either in front or to the rear of the vehicle.

It further provides for an ideal engineering design in which the center line of the main shaft of the engine and axles are all in a single plane parallel with the terrain. With this design there is no permanent angular transmission of power and its consequent torque loss.

It further provides a transmission differential that has ample room to provide for any member of forward and reverse speeds without crowding and a direct drive from motor shaft to pinion gear shaft of the transmission differential.

As a salient feature of my invention I provide the transmission differential which may be connected to all the other differential members through take off power units from the transmission differential and that all are rigidly mounted on cross members of the chassis there being no relative spring movement between the power plant and the driving axles; that each wheel is connected to one of the axles of the differentials through a separate universal joint and spline shaft connection and thus floating flexible power is transmited individually to the wheels without any relative movement between the power plant and the driving axles of the differentials.

In addition thereto, it provides a simple, inexpensive design that may be applied to a cheap competitive automobile of the four wheel type.

The foregoing and other features of my invention will now be described in connection with the accompanying eight sheets of drawings forming part of this specification in which I have represented my transmission differential in its preferred form, after which I shall point out in the claim those features which I believe to be new and of my own invention.

In the drawings,

Figure 1 is a diagrammatic elevation of a vehicle embodying my invention as applied to a simple two wheel drive automobile.

Figure 2 is a diagrammatic elevation of a vehicle showing both front and rear drive on six wheel chassis with one or two motors.

Figure 3 is a plan view of vehicle shown in Figure 2, but having four wheels front and rear.

Figure 5 is a cross-section along line 5—5, Figure 4.

Figure 6 is a vertical section at right angles to that shown in Figure 5 taken along the line similar to that shown in Figure 4.

Figure 7 is an end view of left hand flange of the differential spider, line 7—7, Figure 6.

Figure 8 is an end view of right hand flange of differential spider, line 8—8, Figure 6, showing cut away portion for lubrication purposes.

Figure 9 is a detail of power take off section taken along line 9—9, Figure 5.

Figure 10 is a section along line 10—10, Figure 9, showing clutch for engaging power of extra wheels.

Figure 11 is a similar one to that shown in Figure 10.

Figure 12 is a detail of control of clutch for engaging power to extra set of wheels.

Figure 13 is a plan view of steering arrangement when multiple front steering wheels are employed.

Figure 14 is an elevation of front wheel connection showing free wheeling suspension.

Figure 15 is an elevation of rear wheel connection showing the driving connection.

Figure 16 is a plan of detail shown in Figure 14.

Figure 17 is a plan of detail shown in Figure 15.

Figure 4:
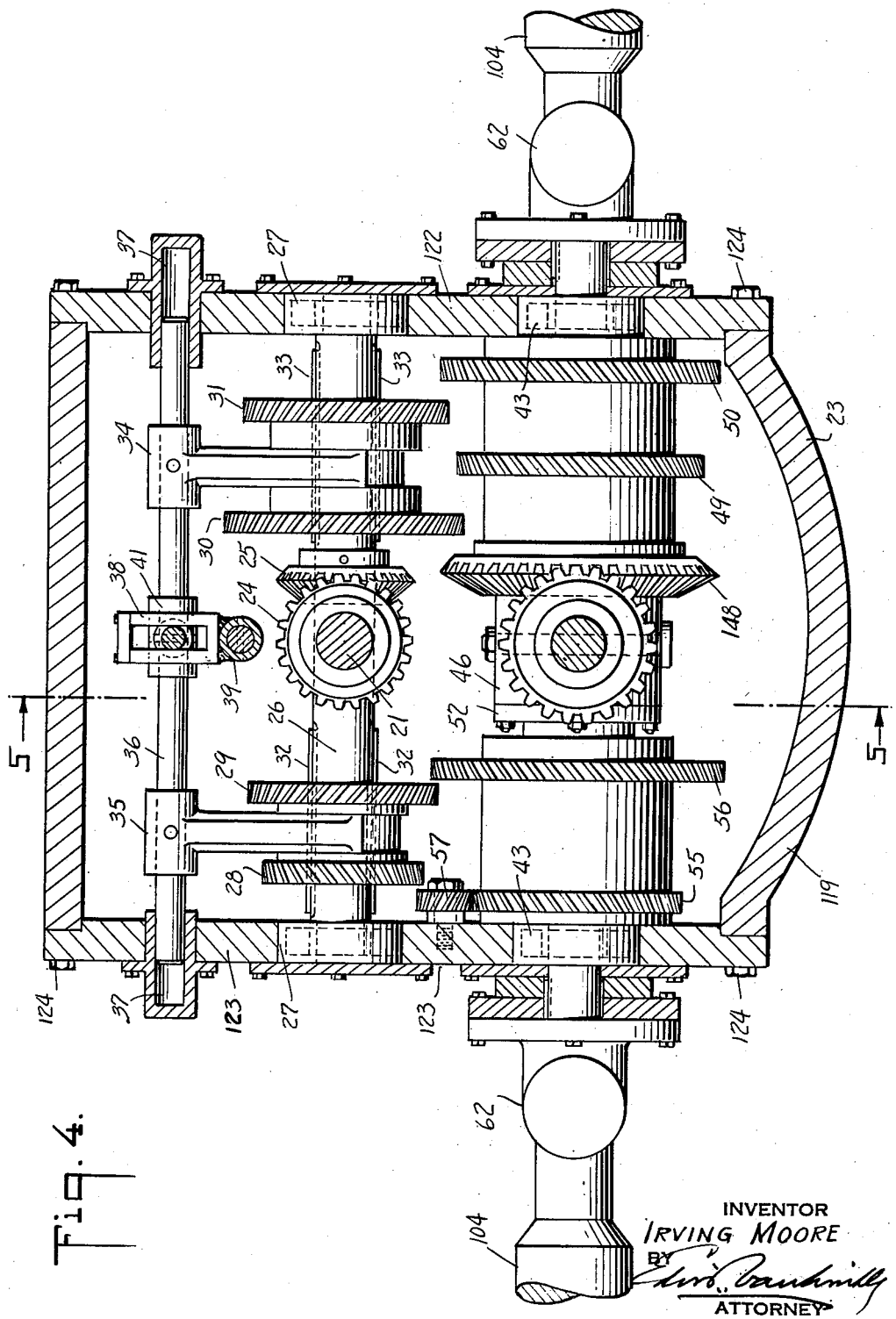
Figure 4 is a vertical end view in part section through the transmission differential along the line 4—4, Figure 3 and Figure 5.

In Figure 1 which is a diagrammatic sketch of a simple automobile embodying my invention I show a motor 11 through its usual clutch 12 directly connected to a transmission differential 13 driving the wheels 14. The steering wheels are shown at 214. The chassis of the automobile is represented as 15.

In Figure 2 a modification is shown in which the motor 11, clutch 12, transmission differential 13 are substantially the same as shown in Figure 1 and to which are added auxiliary shafts 16 and 17 receiving their take off from the differential 13. With this arrangement the power may be transmitted to the front wheels through the drive shaft 17 or it may be used to drive a third set of wheels directly ahead of the four wheel unit. Means 18 is provided to cut in and out of action the extra set of wheels which when not used in the driving unit, may run free wheeling. Details will follow.

In Figure 3 a further development of the invention is diagrammatically represented. Herein there are four pair of wheels 14, all connected to the power plant, after the manner disclosed in description of Figure 2. In this case the controls 18 are connected so that any combination of driving wheels may be employed. It will be observed that the connecting rod 18 on the top of the drawing is connected only to the extreme front and rear wheel differential housing, while the lower connecting rod 18 is connected to move all four of the cut offs.

Referring now more particularly to Figures 4, 5 and 6. The motor 11 through the usual clutch 12 arrangement is directly connected to a shaft 21 mounted in bearings 22 in housing 23. On the opposite end of shaft 21 is provided a bevelled gear 24. The gear 24 meshes with bevelled gear 25 which is keyed or pinned to a shaft 26 mounted to rotate in bearings 27. This shaft carries the sliding gears 28, 29, 30, 31 of the transmission. These gears are adapted to slide on the shaft 26 along the key 32, 33 and are moved thereon laterally by arms 34 and 35 pinned to shaft 36, the shaft being mounted to slide in bearings 37 mounted in the side plates 122 and 123 of the housing 23. The shaft 36 may be slidably moved in the bearings 37 by means of the bell crank 38 mounted to rock on shaft 39. The bell crank is provided with slots 40 in which slides a trunnion 41 which is pinned to shaft 36. On the ends of shaft 39, I provide bell cranks 42 which may be linked to the steering post of the vehicle by any convenient means so as to provide control of the shifting of the gears. As this link connection is in common practice it is thought that no further description is necessary.

It will be observed by referring to Figures 4 and 6, the main differential shaft 45 is mounted in bearings 43 in side plates 122 and 123 of housing 23 and is parallel to the shaft 26 and also at right angles to center line of motor shaft 21.

With this construction the four differential gears are used in which gears 143 and 144 are mounted to turn on shaft 145 which in turn is mounted in differential spider 46. The spider 46 carries a central shaft 45 on one end of which is a bevelled gear 48 adapted to mesh with the gears 143—144. This shaft is free to turn in the spider and is mounted in bearing 43 mounted in the side plates 122 of housing 23. On the outer portion of the spider cylinder 46, I provide a bevelled take off gear 148 and two spur gears 49 and 50, all keyed to the spider by means of suitable key 51. Bevelled gear 148 is used for take off power for multiple drive, hereinafter explained.

The spur gear 49 is adapted to receive in mesh the gear 30 to provide high speed to driving wheels, while the spur gear 50 is adapted to receive in mesh gear 31 to provide an intermediate speed. The arrangement of the differential gears will be readily understood by a study of Figure 8 which is the end view of the spider, open so as to expose the differential gears in mesh.

The bevelled gears 143—144 are mounted to freely turn on pinion shaft 145 which is carried by spider housing 46 and are so spaced that they freely mesh with gear 48 on shaft 45 and gear 60 on shaft 59 forming a true differential.

On the opposite end of the differential shaft I provide a complementary spider 52 which is adapted to be bolted to the end of spider 46 by means of a plurality of studs 53. When these two spider members are thus joined the cut away portions 54 are provided to give free access for lubricant to flow to the four differential gears so that they will always run in the proper lubrication.

The spider 52 carries, keyed to its outer diameter, the gears 55 and 56 in spaced relations so that 55 may serve a reverse speed gear when gear 28 is engaged with pinion 57 pivoted to side plate 123 of housing 23 as at 58. Spur gear 56 is adapted to engage spur gear 29 forming the low speed forward drive. This spider encloses, centrally mounted to turn, a shaft 59 which carries the fourth spur gear 60 of the differential. The shaft 59 is mounted in bearing 43 and serves as a driving shaft connected to the wheels suspension through a universal joint 62 hereinafter fully described.

By referring to Figure 5 it will be apparent how the power delivered to the gear 148 of the differential housing can be utilized to add driving power to the vehicle, through take off 63.

Mounted in the housing, located on opposite sides thereof, I provide a take off unit 63 adapted to snugly fit an opening 64 in the housing 23. This unit consists of a stub shaft 65 mounted in bearings 66. On the inner end I provide a bevelled gear 67 adapted to mesh with gear 148 of the transmission spider 46 and on the opposite end I provide a clutch plate 68 carrying a recess 167 in which is mounted a bearing 166. The face of the place 68 is provided with means to engage a complementary plate 78 adapted to slide on shaft 69 but keyed thereto by means of key 70. The shaft 65 is mounted in bearing 71 in the housing of unit 63 and in the bearing 166 of the end plate of the take off housing.

To engage and disengage the clutch faces 68 and 78, I provide bell crank 80 pivotedly mounted at 81 on shaft 82. On either end of shaft 82 which is mounted to turn in bearings in housing 63, I provide a bell crank 83 which is connected for operation to rod 19 and through link motion 84 to steering post so that the driver may cut in and out the auxiliary driving wheels to permit free wheeling or power drive at will.

When my invention is adapted for multiple wheel drive and it is desirable to have both front and rear wheels driving in multiple, I provide a steering arrangement illustrated in Figure 13 which is an underside view of such a preferred hook up. The wheels 14 are linked together with the usual link 181 provided with aligning means 182. Turn buckle 182 is illustrated but I do not wish to limit myself to that detail as any means of alignment may be used. In the center of these connecting links I provide a stud 183 which is adapted to slide in slot 184 of link 85 pivoted at 86 to the chassis 15. When this link is moved it operates the wheels. Diagrammatically I show typical steering wheel 90, a worm 91 in the steering column, the worm driving a shaft 92 in the end of which is a bevelled gear 93 meshing with complementary gear 94 mounted on the link 85.

Each wheel is independently sprung as will be readily understood by referring to Figures 3, 14, 15, 16 and 17. Figures 14 and 16 are elevation and plan of the wheel used for steering, while in Figures 15 and 17 are shown plan and elevation of the driving wheel. In these views the exterior housing 23 of the transmission differential is shown attached to a member of the chassis 15. The power is exerted at universal joint 62, all as previously described. Mounted on the wheel hub 101 is a flange 102 of a universal joint 103 connected to universal joint 62 by a spline shaft 104. To control the movement of the wheel I provide a saddle member 105 which straddles the universal joint 103 and is connected by suspension member 106 to a cross member of chassis 15. Interposed between the chassis 15 and the saddle member 105, I provide a spring 107. The saddle member 105 is provided with a plunger 117 which is centrally mounted with respect to spring 107 and extends through a member of the chassis 15. Pivotedly attached to the top of the plunger 117 is a lever 108 fulcrumed at 109. The end of the lever opposite the pivot connection rests upon a cushion 110, the object of which is to provide dampening effect upon excessive spring action and to absorb rebounds over rough terrain.

The wheel hub 101 contains the usual break surface 120 and extensions 121 for mounting on spindle 112 when the wheel is used as a steering wheel. The opposing spindle connections 100 are a part of saddle 105.

By referring to Figures 4, 5 and 6 it will be observed that the transmission differential is enclosed in a housing 23, having a main section 119 with side plates 122 and 123. These plates may be bolted to the main section by means of body fit bolts 124. Each of the plates 122 and 123 are provided with bearings 43 for the differential shaft, and bearings 27 for the drive gear shaft of the transmission, and bearings 37 for the sliding shaft which carries the arms 34 which are provided to slide the sliding drive gears 28, 29, 30, 31 so as to mesh with the driven gears 57, 56, 49 and 50 as desired.

This housing will contain the lubricant in which the gears of the differential and the transmission run.

I wish it distinctly understood that my transmission differential herein illustrated and described is in the form in which I desire to construct it and that changes or variations may be made as may be convenient or desirable without departing from the salient features of my invention and I therefore intend the following claim to cover such modifications as naturally fall within the lines of invention.

I claim:

A vehicle having in combination front and rear wheels, a motor, clutch and transmission housing mounted with its central axis transverse to the central axis of the vehicle motor, a driving shaft mounted in said housing having its axis transverse to the said motor axis, a differential mechanism mounted in said housing parallel to and below said driving shaft, said differential having an elongated spider casing, a bevelled gear fixedly mounted on said casing, change speed driven gears fixedly mounted on said casing, change speed drive gears slidably carried by said drive shaft and adapted to mesh with said driven gears, means including a clutch for connecting the motor to said transmission drive shaft, auxiliary power units including means adapted to drive the front and rear vehicle wheels, connecting means for establishing a drive connection between said bevelled gear and said power units including a stub shaft mounted on bearings in said housing and carrying a bevel gear engaging said first mentioned bevel gear, a clutch member on the end of said stub shaft, a second stub shaft mounted in said housing and having a complementary clutch member adapted to engage the other clutch member and means supported by said housing and adapted to engage and disengage said stub shaft clutch.

IRVING MOORE.

REFERENCES CITED

The following references are of record in the file of this patent:

UNITED STATES PATENTS

| Number | Name | Date |
| --- | --- | --- |
| 1,064,213 | Herman | June 10, 1913 |
| 1,068,598 | Martyn | July 29, 1913 |
| 1,539,417 | Huber | May 26, 1925 |
| 1,679,805 | Blumer | Aug. 7, 1928 |
| 2,064,262 | Keese | Dec. 15, 1936 |
| 2,166,099 | Quartullo | July 11, 1939 |
| 2,183,667 | Buckendale | Dec. 19, 1939 |
| 2,206,752 | Price | July 2, 1940 |
| 2,232,154 | Wagner | Feb. 18, 1941 |
| 2,384,781 | Rockwell | Sept. 11, 1945 |

FOREIGN PATENTS

| Number | Country | Date |
| --- | --- | --- |
| 10,347 | Great Britain | Apr. 28, 1911 |
| 11,476 | Great Britain | May 9, 1910 |
| 828,869 | France | Feb. 28, 1938 |